Patented June 30, 1925.

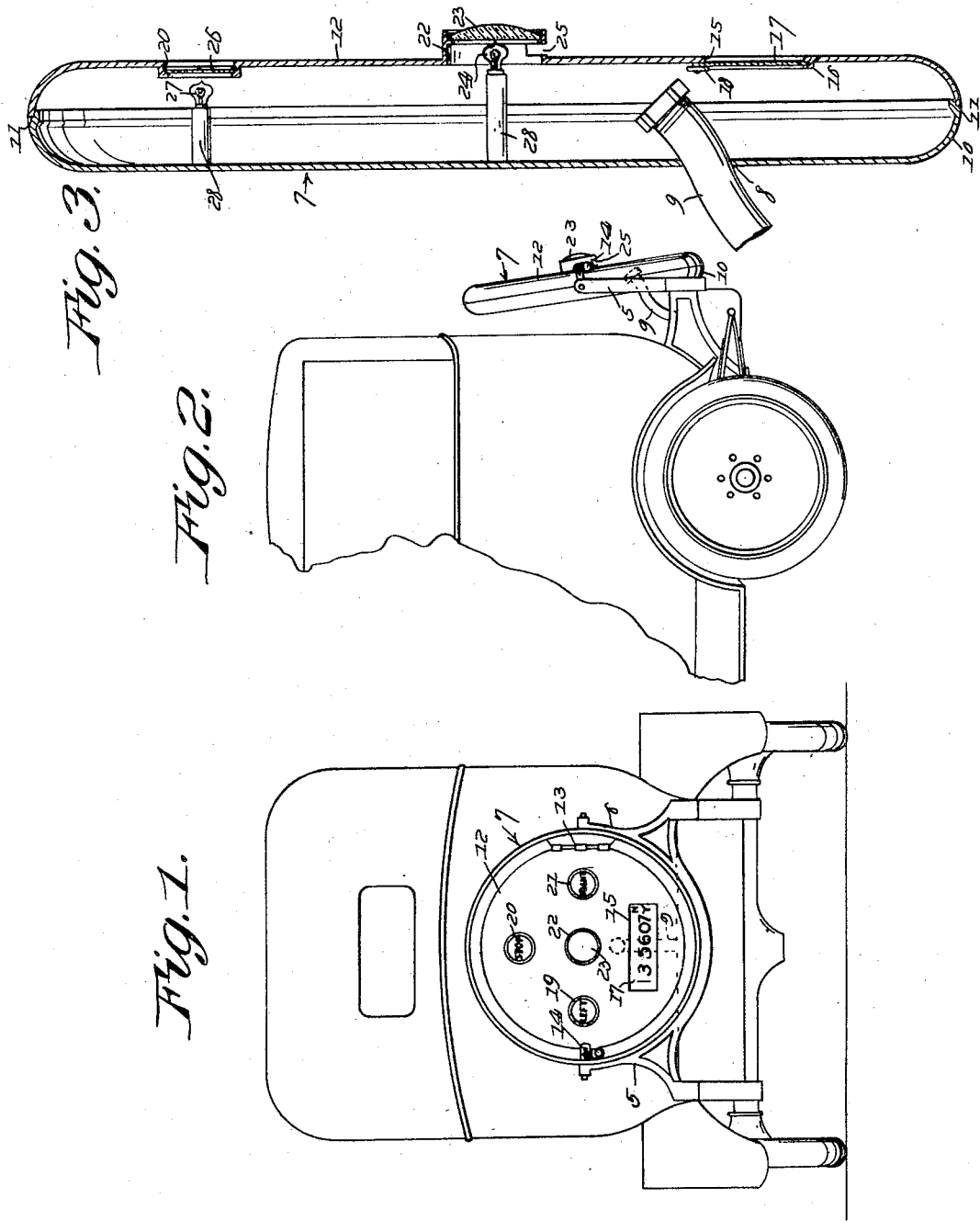

1,543,995

UNITED STATES PATENT OFFICE.

DAVID H. FISHER, OF ALBANY, NEW YORK.

APPLIANCE CARRIER FOR AUTOMOBILES.

Application filed January 30, 1923. Serial No. 615,907.

*To all whom it may concern:*

Be it known that I, DAVID H. FISHER, a citizen of the United States of America, and resident of Albany, in the county of Albany and State of New York, have invented certain new and useful Improvements in Appliance Carriers for Automobiles, of which the following is a specification.

This invention relates to combined spare tire holders for automobiles and a traffic signaling device associated therewith, whereby the direction of intended travel of the operator of the automobile may be signaled at the rear of said automobile.

It is a further object of this invention to produce holders for spare tires which will serve to protect the tires in the holders; and the said invention also contemplates the provision of novel means for closing an opening in each holder in order that access to the tire may be prevented by unauthorized persons.

The invention furthermore includes novel means associated with the tire holder for holding a license plate and for exhibiting the signals heretofore mentioned.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of the rear of an automobile, showing a tire holder embodying the invention applied thereto;

Figure 2 illustrates a side elevation thereof; and

Figure 3 illustrates an enlarged sectional view of the tire holder with the filling spout of the fuel tank in elevation.

In these drawings, 5 and 6 denote suitable brackets having a tire shield 7 mounted thereon, and in this embodiment of the invention, the shield has a solid back wall except for the opening 8 through which the filling pipe 9 projects, for a purpose that will presently appear. The back plate has an annular flange 10 extending outwardly, and the edge of this flange is provided with a shoulder 11 against which the door or closure 12 for the tire abuts, the said closure being mounted on a hinge 13 in order that it may be opened to permit the removal of the tire. The closure is in the nature of a door and it may be secured in closed position by suitable fastening and lock, conventionally shown at 14. The exact construction of the latch or interlocking parts and the lock employed are immaterial details and may be changed to suit particular requirements.

The closure has a rectangular opening 15, and the inner wall thereof has a seat 16 for the edge of a license plate 17 so that the license plate may be removably secured in place by a suitable fastening such as a latch 18. The license plate lies back of the opening, but is exposed therethrough in order that the authority for operating the automobile may be exhibited.

The closure may also have a plurality of openings 19, 20, 21, 22, the latter of which may have a lens 23 to be illuminated by a lamp 24 to be used as the ordinary "tail light" of an automobile and it has a clearance 25 through which light may be thrown downwardly to illuminate the plate.

The openings 19, 20 and 21, in the present embodiment of the invention, have glass panes such as 26, that may bear proper legends such as "Left," "Stop" and "Right," respectively, and when a lamp such as 27 is illuminated back of the appropriate legend, it may indicate the direction that the operator will travel in turning, or it may indicate his intention to stop, according to the light that is illuminated.

The lamp sockets 28 may be mounted on the inner wall of the back plate, or they may be mounted on the door, these being details of construction which those skilled in the art will understand and further illustration is believed unnecessary. The only requirement in this connection is that the lamps shall be so positioned as to leave sufficient clearance for the accommodation of ordinary tires and demountable rims which the carrier is to contain.

The gasoline filling tube terminates in the tire case and when the closure of the tire case is locked, access to the gasoline tank of the automobile will be prevented, and therefore, the gasoline cannot be surreptitiously removed.

I claim:

1. In appliance carriers for automobiles, a plate having a marginal flange forming an enclosure, a door therefor, means for holding the door against movement, and a gasoline filling tube extending through the plate and terminating back of the door.

2. In appliance carriers for automobiles, a plate having an annular flange forming a receptacle, a closure therefor, means for holding the closure against movement, and a gasoline filling tube extending through the plate and terminating back of the closure.

DAVID H. FISHER.